United States Patent
Vogel

[11] Patent Number: 5,914,464
[45] Date of Patent: Jun. 22, 1999

[54] SELF-SERVICE DEVICE FOR PROCESSING A MAIL PIECE

[75] Inventor: Karl Vogel, Fürth, Germany

[73] Assignee: Mettler-Toledo GmbH, Greifensee, Switzerland

[21] Appl. No.: 08/939,286

[22] Filed: Sep. 29, 1997

[30] Foreign Application Priority Data

Oct. 29, 1996 [DE] Germany .......................... 196 44 847

[51] Int. Cl.[6] .............................. G01G 19/00; G01B 1/00
[52] U.S. Cl. ...................... 177/145; 177/25.11; 177/180; 177/238; 33/549
[58] Field of Search .............................. 177/25.13, 25.14, 177/25.15, 145, 253, 262, 25.11, 25.12, 180, 238, 239, 243; 33/549, 832, 833; 705/406, 401, 410

[56] References Cited

U.S. PATENT DOCUMENTS 5,535,127  7/1996  Uno et al. .......................... 364/464.02

FOREIGN PATENT DOCUMENTS 0657712  6/1995  European Pat. Off. .
2750875  5/1978  Germany .
2518884  3/1986  Germany .
4015852  11/1991  Germany .
9306982  11/1993  Germany .
9311263  11/1993  Germany .
9308337  12/1993  Germany .
9311497  1/1994  Germany .
690 13 768  3/1995  Germany .
3706646  9/1997  Germany .

OTHER PUBLICATIONS

Patent Abstracts of Japan, Publication No. 07128019 A, May 19, 1995 Outer Shape Dimension Weight Measuring Instrument and Postage Counter.

*Primary Examiner*—Randy W. Gibson
*Attorney, Agent, or Firm*—Friedrich Kueffner

[57] ABSTRACT

A self-service device allowing postal customers to determine the postage fees for letters and small parcels has a weighing scale and also registers the thickness and format size of the mail piece in a simple manner. A receiving chamber for the mail piece sits on the scale and contains sensors for acquiring the thickness and format information.

27 Claims, 7 Drawing Sheets

SELF-SERVICE DEVICE FOR PROCESSING A MAIL PIECE

BACKGROUND OF THE INVENTION

1. Field of the Invention

The present invention concerns a self-service device for processing a mail piece, particularly a letter or a small parcel, to determine the postage fee with a scale that measures the weight.

The intent is to make it easy for the customers in post offices to dispatch their mailings, i.e., determine and affix the correct postage, through self-service.

2. Description of the Related Art

According to the state of the art, post-offices used to have dial-head scales with postage fee tables. On these, however, it was cumbersome to read the applicable postage fees for common kinds of mailings.

In a typical postage fee structure distinctions are made in particular a) according to the kind of mail piece: letter, post card, aerogram, and small parcel, b) according to the shipping mode: surface, air, and express, as well as c) according to the destination: domestic, neighboring countries, world.

Letters are specifically classified with designations such as "standard letter", "compact letter", "large letter" and "extra-large letter", the distinguishing parameters being the weight, thickness, and format size, with different postage fees being charged for the different kinds of letters.

Because it is difficult for the postal customer to determine the correct fee for a piece to be mailed, one postal organization under a pilot project has made available to its customers a set of equipment comprising a scale to weigh the mail piece, a slot arrangement to measure its thickness, and a template to determine the format. This arrangement, too, has to be considered cumbersome to use, because the postal customers themselves have to perform numerous manual operations, decisions and settings in order to get the apparatus to indicate the required postage.

SUMMARY OF THE INVENTION

The object of the invention is to propose a device of uncomplicated construction of the kind mentioned at the beginning, allowing the postal customer to process a mail piece in a self-service mode, particularly with regard to determining its thickness.

According to the invention this is accomplished with a device that includes a weighing scale. Attached to the weight receiving part of the scale is a receiving chamber for the mail piece which is enclosed by four walls and has a hinged lid. Inside the receiving chamber and opposite the lid, a receiving plate for the mail piece is supported with the help of spring means that serve to push the receiving plate towards the lid, while the lid in its closed state presses against the mail piece that is lying on the receiving plate, whereby the receiving plate is displaced from its null position against the force of the spring means by an amount corresponding to the thickness of the mail piece. A measuring device is provided for the purpose of determining the displacement of the receiving plate in the closed state of the lid and thereby measuring the thickness of the mail piece.

With this device, all the postal customer has to do is open the lid, put the mail piece on the receiving plate, and then close the lid. Following that, the determination of the weight and thickness of the mail piece occurs automatically. Thus, the postal customer does not have to pass the mail piece through slots of different widths before or after weighing it and then enter the correct thickness on a keyboard. The weight and thickness which are acquired simultaneously by the device are available for further processing in an electronic unit such as a microprocessor in which the postal fees are stored.

Also, it is advantageous that the postal customer initiates the determination of the weight and thickness with one single intuitive operation and that the respective determinations of the weight, format and thickness of the mail piece occur practically at the same instant.

The device as described also has the advantage that its simple and robust construction is of low mechanical complexity, particularly because no sophisticated electromechanical motor drive is required for the thickness determination and because a standard type of weighing scale can be used.

In an advantageous development of the invention, optical sensors for recognizing the format of the mail piece are installed on the receiving plate. Depending on the format of the mail piece on the plate, the optical sensors are either covered or not covered. The current condition of coverage is further processed in the electronic unit. Thus, the postal customer has no entry keys to operate, neither with regard to weight nor thickness nor envelope format of the mail piece, because these parameters are acquired automatically.

The device is equipped to be connected to a printer that delivers a printout of the parameters of the mail piece, or directly to a postage stamp vending machine or a postage meter.

In a preferred development of the invention, the lid covers the top of the receiving chamber, the receiving plate is arranged horizontally, and the spring means act in the vertical direction, as the lid in its fixed position pushes the receiving plate downward by pressing against the mail piece that has been put on the receiving plate. The weight of the mail piece acts against the spring force of the spring means in the same direction as the weight determination performed by the scale. This makes it easy for the postal customer to insert the mail piece and to close the lid. However, it would also be possible to arrange the lid on the side with the flat receiving plate positioned vertically and the spring means acting horizontally, transverse to the loading direction of the scale. In this case the mail piece is inserted in the receiving chamber in an upright position, with its format surface area extending in a vertical plane.

Other advantageous developments of the invention will become evident from the following description.

DETAILED DESCRIPTION OF THE PREFERRED EMBODIMENTS

The device includes a weighing scale with a scale base (1) and a weight-receiving scale top (2). Supported on the scale top (2) is a receiving chamber (3), which is delimited by a front wall (4), a rear wall (5) and side walls (6,7). Connected with the walls (4 through 7) is an intermediate plate (8) which rests on the scale top (2) by means of support blocks (9).

In the receiving chamber (3) a receiving plate (10) is mechanically guided for vertical movement. For this purpose, the receiving plate (10) has guide rods (11) extending through bushings (12) in the intermediate plate (8). The null position of the receiving plate (10) is adjustable by means of adjusting collars (13) associated with the guide rods (11) below the intermediate plate (8). To securely guide the parallel movement of the receiving plate (10) between the walls (4 through 7), two pairs of scissors (14,15) are provided, each of which has an outer member (16) and an inner member (17). At the four upper ends of the members are rollers (18) that support the receiving plate (10) at its bottom side. The rollers (19) at the lower ends of the members run inside U-shaped guide rail profiles (20) of the intermediate plate (8).

Figures 4, 5, 6:
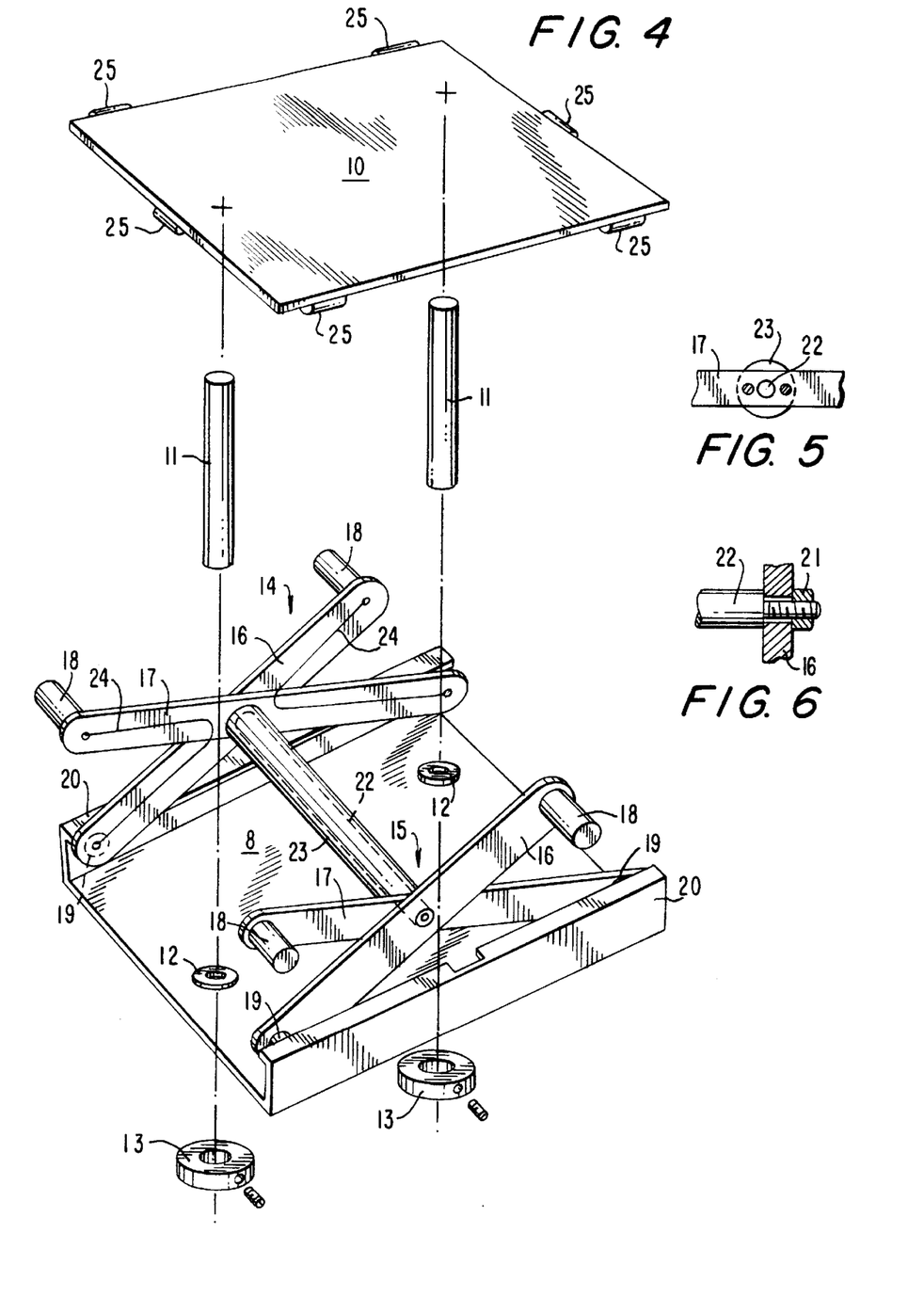
FIG. 4 represents an exploded view of the receiving plate of the device and its support mechanism.
FIG. 5 represents a detail of the scissors bearing.
FIG. 6 represents a further detail of the scissors bearing.

The two scissors (14,15) are connected with each other in order to make them move together. For this purpose, the outer members (16) are fastened to both ends of a shaft (22) by means of lug nuts (21). The inner members (17) are fixed on a tube (23) which surrounds shaft (22) (see FIG. 5).

Between the outer members (16) and the inner members (17) of each of the scissors (14,15), spring means in the form of bow springs (24) of spring steel wire are arranged so that they try to close the scissors (14,15), thereby pushing the receiving plate (10) upwards. In place of the four bow springs (24) a central helix spring could be provided which at one end pushes against the tube (23) and at the other end is supported by the intermediate plate (8). In place of the scissors (14,15) there could also be other linear guide means provided for the receiving plate (10), e.g., ball bushings.

To prevent the receiving plate (10) from scraping the walls (4 through 7) there are gliders (25) or rollers arranged at the borders of the receiving plate (10).

At the top of rear wall (5) a lid (27) is hinged along a horizontal axis (26). The lid (27) consists essentially of a transparent material. To define the closed position of the lid (27), a stop rim (28) is formed on the front wall (4). At the lid (27) there is at least one magnet (29) provided for holding the lid (27) in its closed position. A switch (30), e.g., a Hall sensor is provided for registering the closed position of lid (27) electronically.

Figure 1:
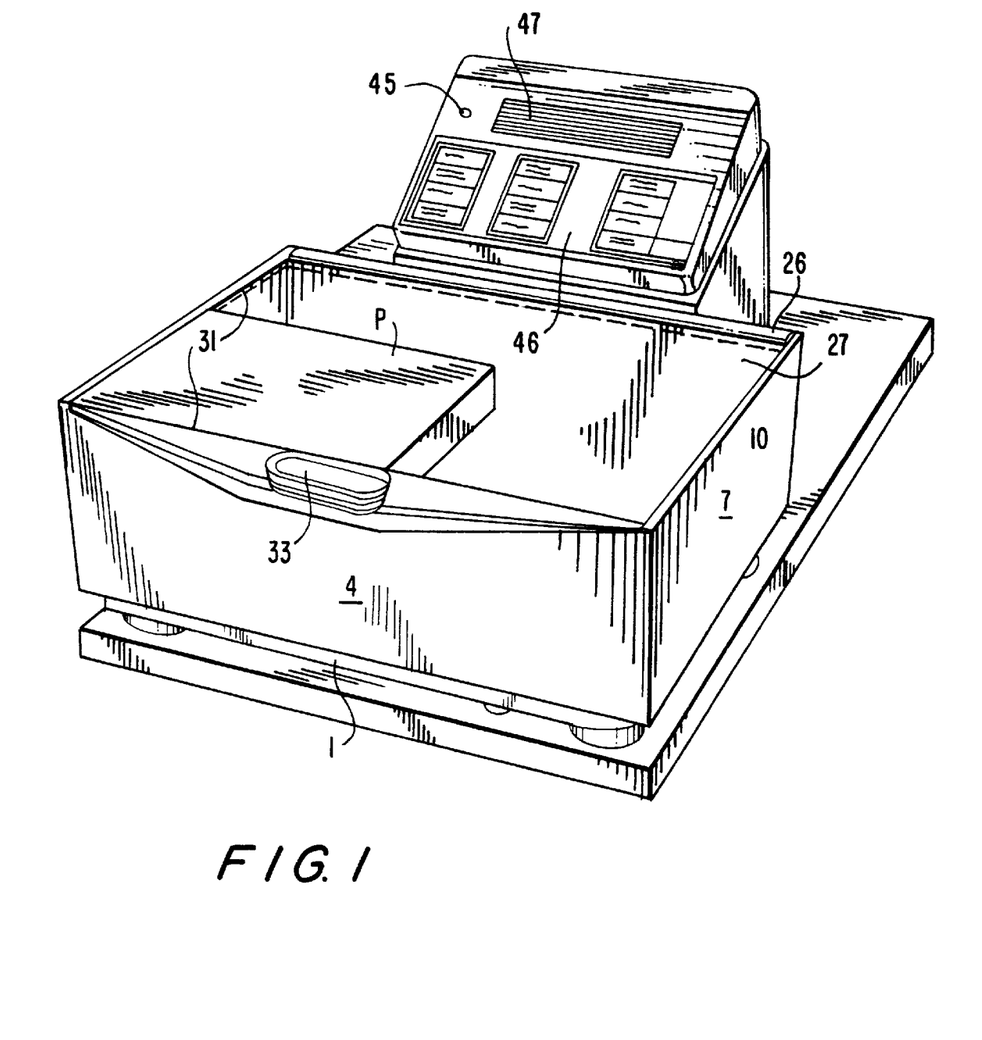
FIG. 1 represents a self-service processing device in a perspective view.
Figure 2:
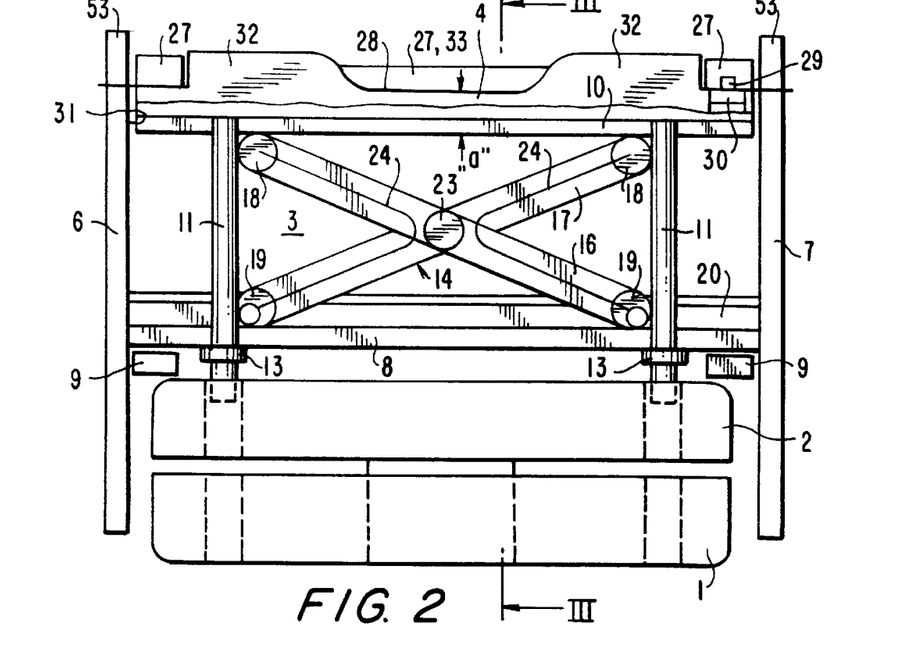
FIG. 2 represents a schematic partial view of the interior of the device along the line II—II of FIG. 3.
Figure 3:
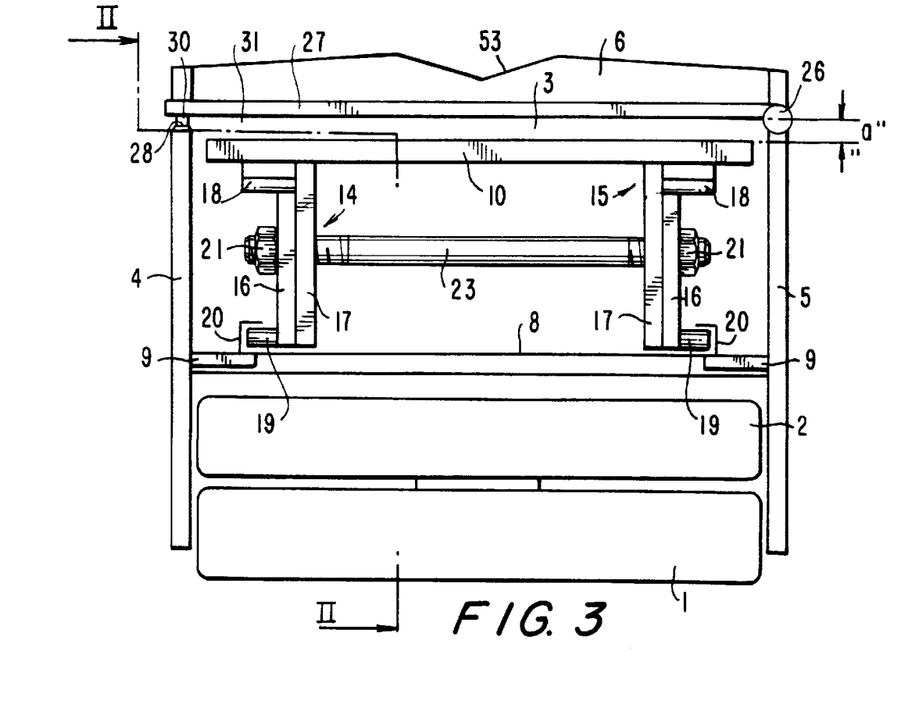
FIG. 3 represents a schematic view along the line III—III of FIG. 2.

In its null position the receiving plate (10) is positioned at a distance (a) below the stop rim (28). The distance (a) is, e.g., 3 mm to 4 mm. In any event, it is less than the maximum height of the mail piece category with the smallest maximum height, i.e., the standard letter with a maximum height of 5 mm. Due to the distance (a), the front wall (4) and the side walls (6,7) form lateral guides for two edges of the mail piece (P) already in the null position of the receiving plate (10). In addition to stop rim (28) for lid (27) in the design according to FIG. 2—but not in the design of FIG. 1—there are upwardly extended portions (32) provided in front wall (4). They facilitate the positioning of the mail piece, particularly if the latter is not flat. The lid (27) has a handle (33) which, in the design of FIG. 2, protrudes between the upwardly extended portions (32) of front wall (4).

Figure 7:
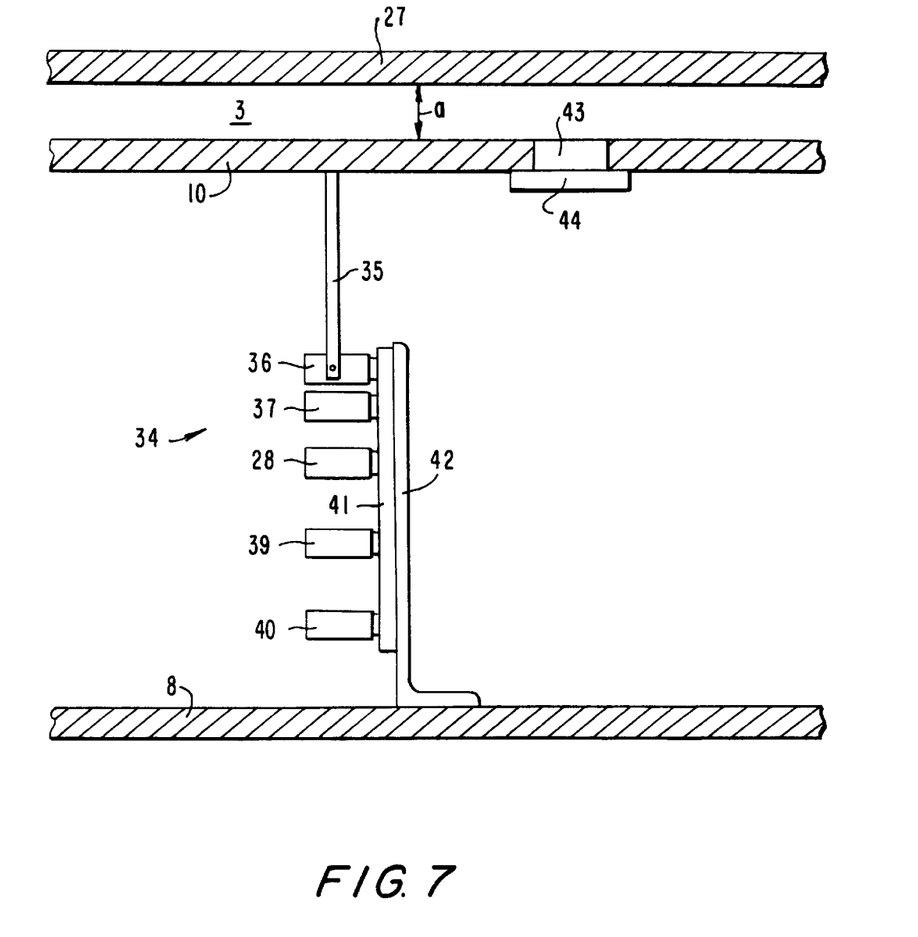
FIG. 7 represents the mechanical set-up of a measuring arrangement.

A length-measuring device (34) is arranged between the receiving plate (10) and the intermediate plate (8). In this, a measuring vane (35) is connected to the bottom of the receiving plate (10), and associated with it is an array of several forked light gates (36 through 40) (see FIG. 7). In the null position of the receiving plate (10) the measuring vane (35) traverses only the forked light gate (36). The forked light gates (37 through 40) are spaced according to the maximum permissible heights of 5 mm, 10 mm, 20 mm, and 50 mm, for the individual categories standard letter, compact letter, large letter, and extra-large letter, respectively. The forked light gates (36 through 40) are arranged on a panel (41) that is fastened to an angle bracket (42) which, in turn, is adjustably mounted on the intermediate plate (8).

Figure 8:
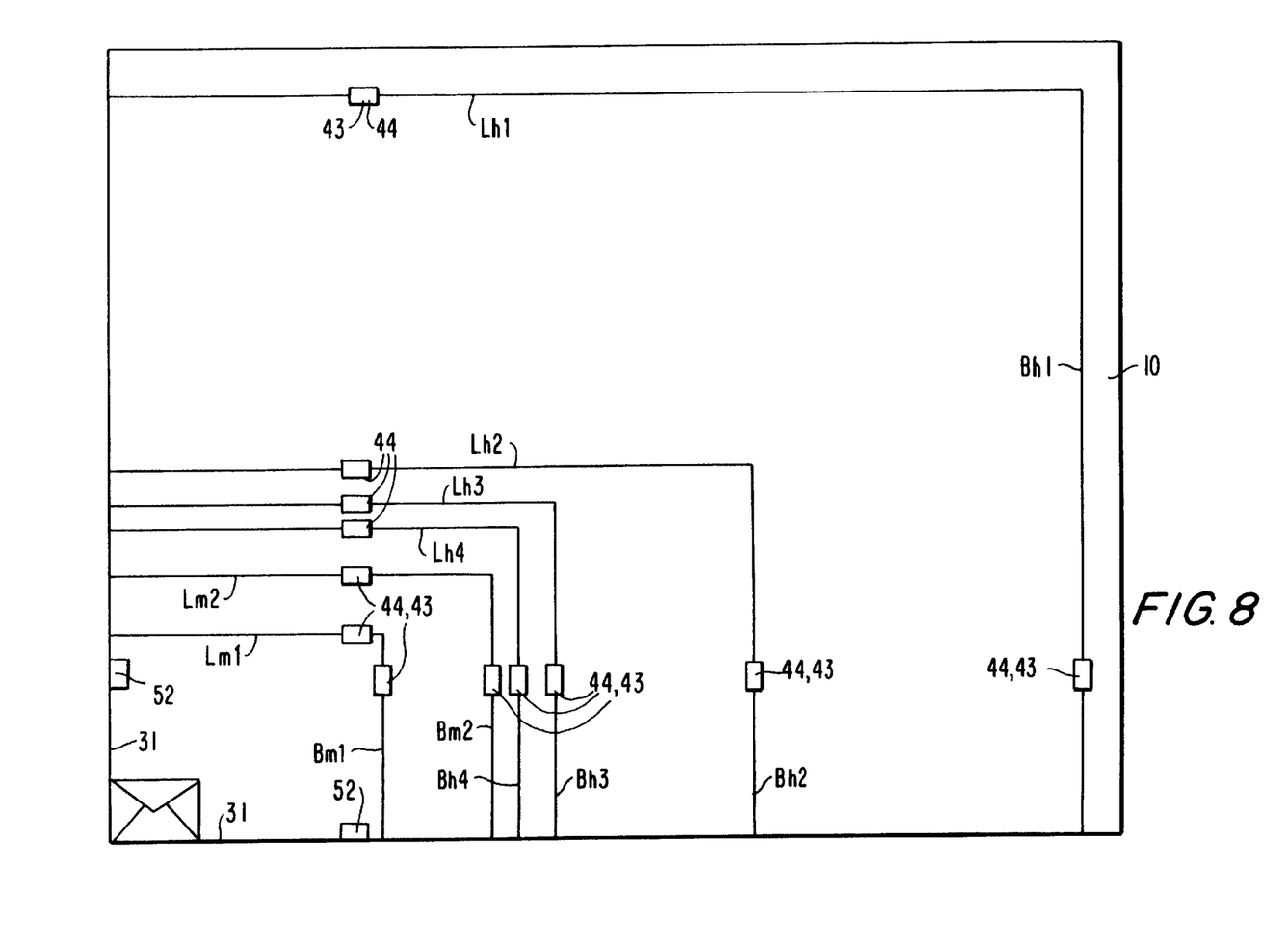
FIG. 8 represents a plane view of the receiving plate with optical sensors.

On the receiving plate (10) there are format demarcation lines (Lh) for the maximum lengths, (Bh) for maximum widths, (Lm) for the minimum lengths, and (Bm) for the minimum widths of the respective kinds of letters according to postal regulations (see FIG. 8). Provided that a letter is put flush against the lateral guides (31), i.e., against the left front corner, the demarcation lines (Lh1, Bh1) represent the maximum format size for large and extra-large letter mailings. The lines (Lm1, Bm1) represent the minimum format size for large and extra-large letters as well as the minimum format size for compact letters. The demarcation lines (Lh2, Bh2) represent the maximum format size for standard and compact letter mailings. The demarcation lines (Lm2, Bm2) represent the minimum format size for standard letter mailings and post cards. The demarcation lines (Lh3, Bh3) represent the maximum format size for post cards. The demarcation lines (Lh4, Bh4) represent the international paper format C6.

Outside of each of the demarcation lines the receiving plate (10) has openings (43) inside or below which are optical sensors (44). Each of these optical sensors works with an emitter diode and a receiver diode. Those of the sensors that are covered by a letter mail piece will transmit a corresponding signal to a processing circuit as is described below.

Additional optical sensors (52) are arranged next to the lateral guides (31). Their purpose is to recognize whether or not the mail piece is positioned flush against the front left corner. If not, then the postal customer is informed accordingly through the display unit (47), to allow the customer to align the mail piece to the lateral guides (31). Alternatively, a single sensor in the left front corner of the receiving plate (10) can suffice for this.

Figure 9:
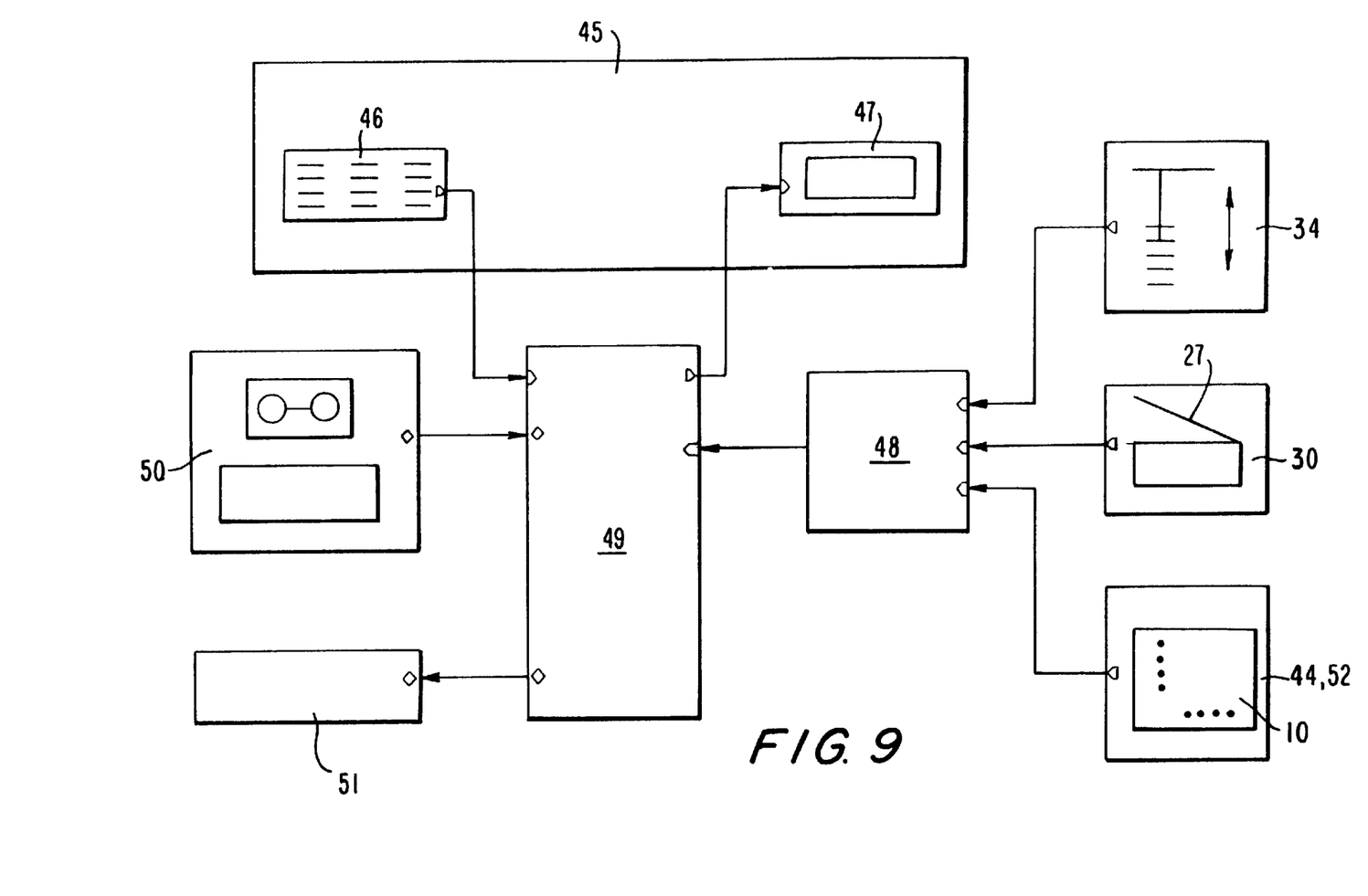
FIG. 9 represents a block diagram of the device.

FIG. 9 shows a block diagram of an electronic unit. Associated with the described device is a user terminal (45) which has a keyboard (46) and a display unit (47). A signal processor (48) receives signals from the length-measuring device (34) concerning the thickness of the mail piece (P), from switch (30) concerning the closed or open state of lid (27), and from sensors (44 and 52) concerning the recognition of the format size. The signal processor (48) is connected to a central processing unit (49) (CPU). Also connected to the CPU are the keyboard (46) and the display unit (47). In addition, the processing unit (49) receives signals representing the weight from an electronic unit (50) of the weighing scale (1,2). In addition to the display unit (47), the processing unit (49) can also have output connections to a printer or a postage stamp vending machine or a postage meter (51).

Figure 10:
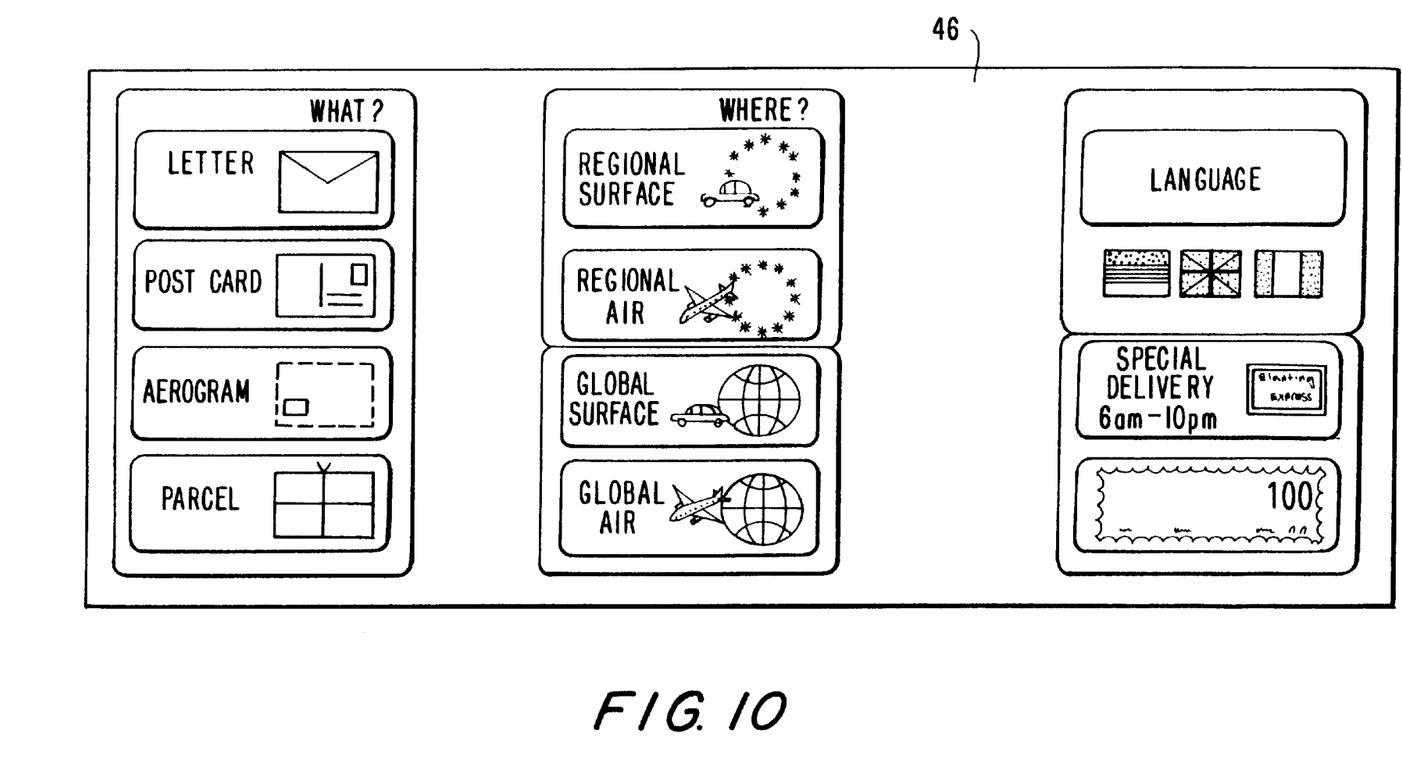
FIG. 10 represents a plane view of the keyboard of the device.

A keyboard (46) that is simple for the user to operate is shown in FIG. 10. When operating the keyboard (46), the user only has to enter whether the mailing piece is a letter, a post card, an aerogram, or a small parcel; whether express delivery is requested; in case of a foreign destination the region and, if applicable, the desired shipping mode (surface or air). Also available to the user are a language key for selecting the language of the display unit and, if applicable, a key that is identified with a stylized postage stamp by which the user may enter a command to transmit the postage fee information to the printer, postage stamp vending machine or postage meter (51). The postal customer does not have to decide what kind of letter the mail piece is (standard, compact, large, or extra-large letter). This is determined automatically by the device. The end result is that the postage required for the mail piece is shown on the display unit (47) and/or given out by the printer, or a postage stamp vending machine or postage meter is being set for the required postage fee.

For the postal customer, the operation of the device just described is very easy and intuitive. To determine the postage fee, all the customer has to do is open the lid (27), position the mail piece flush against the lateral guides (31), and close the lid (27).

When the mail piece is put in place, its weight pushes down on the receiving plate (10) in opposition to the force of the spring means (24). This is advantageous because it facilitates closing the lid (27), meaning that the lid (27) does not have to be pushed down significantly farther with taller mailing objects than with less tall objects against the force of the spring means (24). The weight of the lid (27) itself can be such that it will close on the stop rim (28) and thereby actuate switch (30) without a significant pressure force being exerted by the postal customer. However, it must be ascertained through appropriate sizing of the spring characteristic of the spring means (24) that the receiving plate (10) is depressed by the weight of each mail piece at least slightly less than the weight-dependent maximum thickness that would be allowed for the same mail piece. According to a typical set of postal regulations mail pieces with a weight of 20 g are allowed a thickness of 5 mm. Mail pieces with a weight of 50 g are allowed a thickness of 10 mm. Mail pieces with a weight of 500 g are allowed a thickness of 20 mm. Mail pieces with a weight of 1000 g are allowed a thickness of 50 mm. Accordingly, at each of these weights, the lowering of the receiving plate (10) due to the weight has to be at least 2 mm less than the thickness of the respective piece.

Because the plane lid (27) in its closed position is parallel to the receiving plate (10), meaning that the mail piece in its thickness is positioned between two parallel planes and its surfaces are being compressed by some degree due to the spring means (24) and the lid (27) which is retained in its closed position by means of the magnet (29), this will on the one hand have the effect of squeezing the air out of the mailing envelope, straightening out dog's ears and flattening warps, thereby preventing an erroneous, i.e., too large, thickness measurement. On the other hand, if a mail piece has zones of greater thickness coming from an object placed inside the envelope, such as a ball-point pen, these, too, will be registered correctly.

The weight of those parts of the device that sit on the scale top (2) is tared off. After the lid (27) has been closed, the processing unit (49) registers the weight of the mail piece. The user may be advised through a message on the display (47) to keep from touching the lid (27) or the device in general.

When the lid (27) is closed on the mail piece it will push down the receiving plate (10) according to the thickness of the mail piece. This downward displacement of the receiving plate (10) is registered by the measuring device (34) and processed in the processing unit (49). As a favorable trait in this, the weighing and the thickness determination occur practically at the same time, so that the postal customer does not have to perform any additional manual operations. It is also of advantage that the postal customer does not have to perform separate manual operations for the weighing and for the thickness measurement and that the mail piece (P) (see FIG. 1) remains visible through the lid (27).

Another positive aspect of this device is its low manufacturing cost, because it requires no drive motors and no additional transport movements for the thickness measurement.

When the lid (27) is closed, the determination of the format size of the mail piece by the optical sensors (44) occurs simultaneously with the weight determination by the scale (1,2) and the thickness measurement by the measuring device (34), provided that the mail piece was positioned correctly, which is being monitored by the optical sensors (52). Thus, for the format recognition, too, the postal customer does not have to perform any additional manual operations or entries. Alone from the covered or non-covered condition of optical sensors (44) in the receiving plate (10) as caused by the mail piece (P), the format of the latter is registered and processed in the processing unit (49) in which the applicable postage fees are stored.

Because of its box-shaped configuration, the device is easy to maintain and also safe from vandalism. Also, the device is simple to adapt to different or changing postal regulations. An adaptation to rules concerning thickness is accomplished by appropriate configuration of the measuring device (34), particularly the positioning of the forked light gates (36 to 40). An adaptation to rules concerning formats is accomplished by the arrangement of the optical sensors (44).

Typically, postal regulations contain special rules concerning tube-shaped packages. So as not to complicate the design of the device for this infrequent form of mailing and still allow tube-shaped mail pieces to be weighed, the side walls (6) are provided with V-shaped or rectangular cut-outs (53) into which the tube may be placed. Admittedly, this does not allow the diameter and length of a packaging tube to be measured; but by placing the tube into the V-shaped cut-outs (53), its weight is determined by the scale (1,2). Still, it is also conceivable to configure the device in such a manner that it will also register the diameter (thickness) of the tube as well as its length.

Preferably, the device is dimensioned such that its receiving plate (10) is large enough to accommodate large and extra-large letters and, consequently, small parcels that are not significantly larger than this format. However, mailings are also permissible under the classifications "small parcel" and "extra-large letter to foreign destination", with a considerably larger allowable format size than for extra-large letters to domestic addresses. To configure the device so that the receiving plate (10) can accommodate even the infrequent largest permissible size parcels or extra-large letters to foreign destinations would be easily possible but expensive. The weight of the permissible extra-large mail pieces can be determined simply by placing these mail pieces on top of the closed lid (27) and/or the side walls (6).

I claim:

1. A self-service device for processing a mail piece to determine the postage fee, comprising
   a) a weighing scale with a weight-receiving part to which is attached a receiving chamber for the mail piece, the receiving chamber having a front wall, a rear wall, side walls, and a lid,
   b) a receiving plate for the mail piece, located inside the receiving chamber and opposite the lid, and supported with the help of spring means which serve to push the receiving plate towards the lid, while the lid in its closed state presses against the mail piece that is lying on the receiving plate, whereby the receiving plate is displaced from a null position against the force of the spring means by an amount corresponding to the thickness of the mail piece, and
   c) a measuring device which serves to determine the displacement of the receiving plate in the closed state of the lid and thereby to measure the thickness of the mail piece.

2. The device according to claim 1, wherein the lid closes off the top of the receiving chamber, the receiving plate is arranged horizontally and the spring means act vertically in the direction in which the weight is registered, and the lid in its closed state pushes the receiving plate downwards from the null position by pressing on the mail piece that has been placed on the receiving plate.

3. The device according to claim 1, wherein the lid is hinged along a horizontal axis at the rear of the receiving chamber, and at the front of the receiving chamber a stop rim is formed for the purpose of positively defining the closed position of the lid.

4. The device according to claim 1, wherein the lid in its closed state is held by at least one magnet.

5. The device according to claim 1, comprising at least one switch for registering the closed state of the lid.

6. The device according to claim 1, wherein the lid is designed as a flat plate and in its closed state is positioned parallel to the receiving plate.

7. The device according to claim 1, wherein the lid consists at least in part of a transparent material.

8. The device according to claim 1, wherein when the lid is raised the access to the receiving plate is free for laying down the mail piece.

9. The device according to claim 1, comprising linear-motion guide means inside the receiving chamber to guide the receiving plate.

10. The device according to claim 9, wherein the linear-motion guide means are comprised of two pairs of scissors, and wherein coupling means are provided to cause the two pairs of scissors to move in parallel.

11. The device according to claim 10, wherein the two pairs of scissors have four extremities closest to the receiving plate that have rollers supporting the receiving plate.

12. The device according to claim 10, wherein the two pairs of scissors have four extremities farthest from the receiving plate that have rollers running in U-shaped guide rail profiles of the receiving chamber.

13. The device according to claim 1, wherein the receiving chamber has an intermediate plate arranged parallel to the plane of the receiving plate and supported by the weight-receiving part of the scale so that the front wall, the rear wall, and the side walls form an apron around the weight-receiving part.

14. The device according to claim 1, wherein the receiving plate has gliders or rollers contacting the front wall, the rear wall, and the side walls of the receiving chamber.

15. The device according to claim 1, wherein the receiving plate is restrained relative to the receiving chamber by at least one guide rod which has an adjusting collar for setting the null position of the receiving plate.

16. The device according to claim 1, wherein the receiving plate in its null position is recessed sufficiently relative to a rim of the front wall and a rim of a side wall of the receiving chamber, so as to form a lateral guide for the mail piece.

17. The device according to claim 1, wherein next to the stop rim for the closed position of the lid there is at least one upwardly extended portion.

18. The device according to claim 1, wherein the side walls of the receiving chamber have V-shaped cut-outs rising above the lid in its closed position, for holding tube-shaped packages.

19. The device according to claim 1, wherein the spring force of the spring means is of a magnitude so that the receiving plate will move downward under the weight of the mail piece, and the spring characteristic is selected so that the receiving plate will move downward under the weight of the mail piece only by a distance that is less than the maximum thickness which, according to postal regulations, would be allowed for the applicable fee category.

20. The device according to claim 1, wherein the measuring device has an arrangement of light gates inside the receiving chamber and a measuring vane, and the measuring vane and the light gates are movable in relation to each other in accordance with the thickness of the mail piece.

21. The device according to claim 20, wherein the light gates are spaced in accordance with the maximum thicknesses permitted for the different fee categories of mail pieces.

22. The device according to claim 1, wherein optical sensors are arranged on the receiving plate for the recognition of the applicable format size of the mail piece.

23. The device according to claim 22, wherein at least one additional sensor is provided on the receiving plate in the vicinity of the lateral guide of the mail piece, in order to check the correct positioning of the mail piece on the receiving plate.

24. The device according to claim 1, comprising an electronic unit which
   a) is equipped to receive and process input signals representing the weight and dimensions of the mail piece,
   b) is connected to a key panel and a display, and
   c) computes the postage fee based on the weight and dimensions of the mail piece.

25. A self-service device for processing a mail piece to determine the postage fee, comprising
   a) a weighing scale with a weight-receiving part to which is attached a receiving chamber for the mail piece, the receiving chamber having a front wall, a rear wall, side walls, and a lid,
   b) a receiving plate for the mail piece, located inside the receiving chamber and opposite the lid, and supported with the help of spring means which serve to push the receiving plate towards the lid, while the lid in its closed state presses against the mail piece that is lying on the receiving plate, whereby the receiving plate is displaced from a null position against the force of the spring means by an amount corresponding to the thickness of the mail piece,
   c) a measuring device which serves to determine the displacement of the receiving plate in the closed state of the lid and thereby to measure the thickness of the mail piece, d) a switch for registering the closed state of the lid, e) optical sensors located on the receiving plate for the recognition of the applicable format size of the mail piece, f) an electronic unit to which the weighing scale, the measuring device, the switch, and the optical sensors are connected, the electronic unit being further connected to a key panel and a display, and performing the computation of the postage fee based on the weight and dimensions of the mail piece.

26. A device for determining a postage fee for a mail piece, the device comprising a scale for determining the weight of the mail piece, the scale comprising a stationary part and a weight-receiving part mounted on the stationary part, the weight-receiving part comprising a receiving chamber for the mail piece, the receiving chamber comprising first and second walls extending perpendicularly of a thickness direction of the mail piece and being displaceable relative to each other in the thickness direction between an open position and a closed position of the receiving chamber, and means for applying a restoring force for biasing the first and second walls toward each other, such that in the closed position, the mail piece is received between and contacted by the first and second walls, and, in the open position, the first and second walls are spaced from each other by a distance permitting insertion into and removal of the mail piece from the receiving chamber, further comprising a measuring device for measuring the thickness of the mail piece by determining a distance between the first and second walls when the receiving chamber is in the closed position and a mail piece is received in the receiving chamber.

27. A device for determining a postage fee for a mail piece, the device comprising a scale for determining the weight of the mail piece, the scale comprising a stationary part and a weight-receiving part mounted on the stationary part, the weight-receiving part comprising a receiving chamber for the mail piece, the receiving chamber comprising a lid and a receiving plate for the mail piece, the lid and the receiving plate extending perpendicularly of a thickness direction of the mail piece and being displaceable relative to each other in the thickness direction between an open position and a closed position of the receiving chamber, and spring means for applying a restoring force for biasing the receiving plate toward the lid, such that in the closed position, the mail piece is received between and contacted by the lid and the receiving plate, and, in the open position, the lid and the receiving plate are spaced from each other by a distance permitting insertion of the mail piece into and removal of the mail piece from the receiving chamber, further comprising a measuring device for measuring the thickness of the mail piece by determining a distance between the lid and the receiving plate when the receiving chamber is in the closed position and a mail piece is received in the receiving chamber.

* * * * *